(No Model.) 2 Sheets—Sheet 1.
C. A. HOLLAND.
Harness Maker's Stitching Horse.
No. 232,351. Patented Sept. 21, 1880.
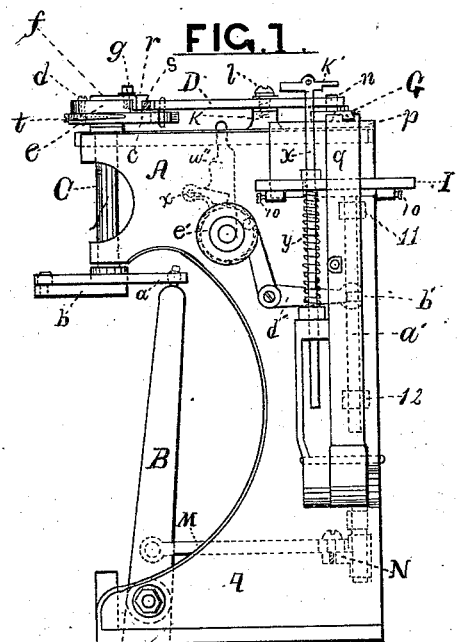
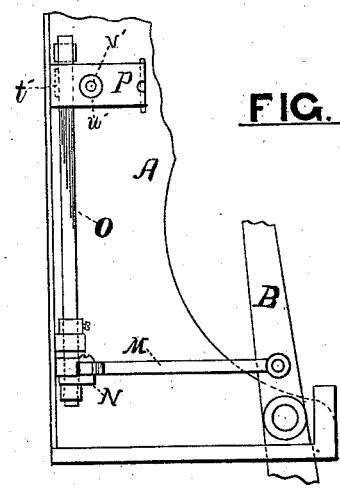
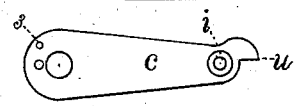
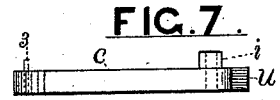
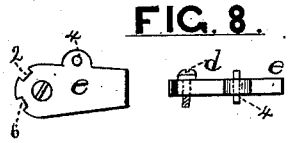
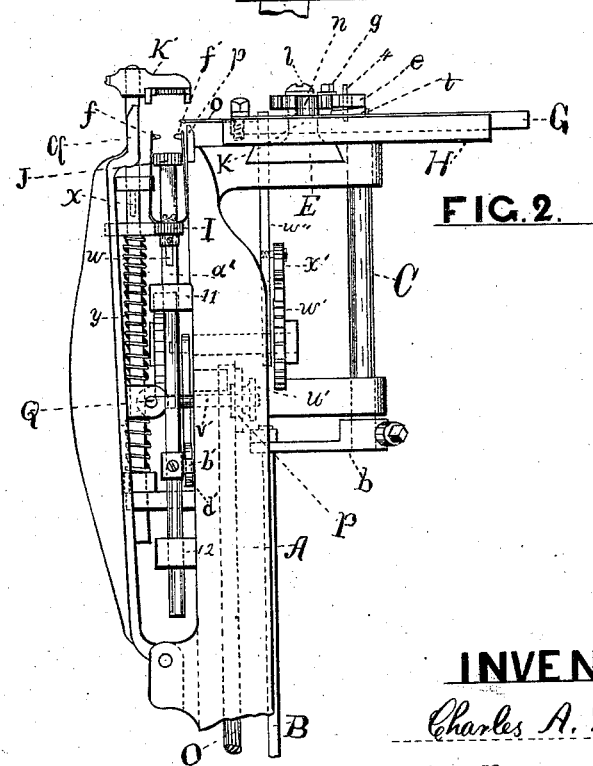
WITNESSES.
Herman Gauss
Christopher Schutte
INVENTOR.
Charles A. Holland
By Geo. D. Phillips (No Model.) 2 Sheets—Sheet 2.
C. A. HOLLAND.
Harness Maker's Stitching Horse.
No. 232,351. Patented Sept. 21, 1880.
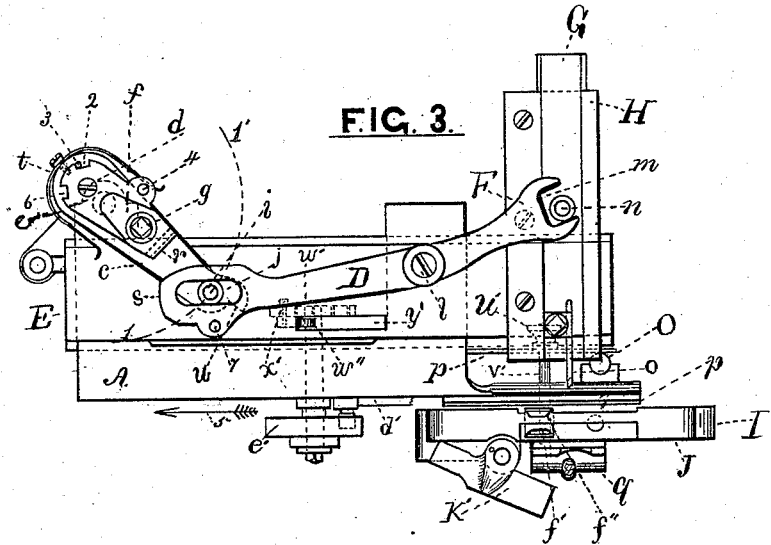
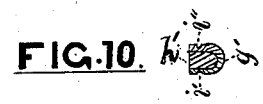
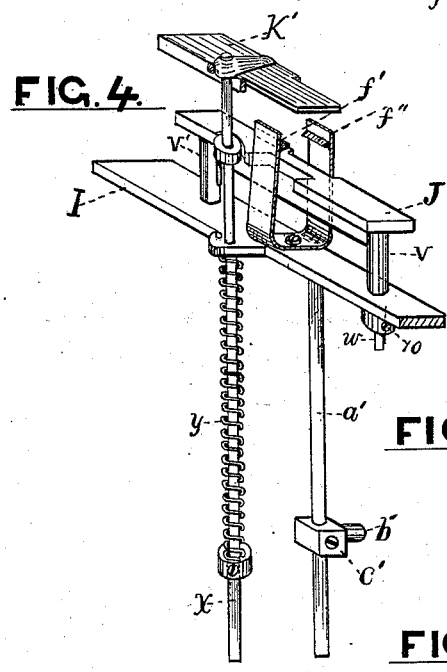
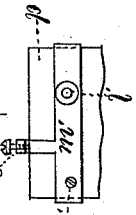
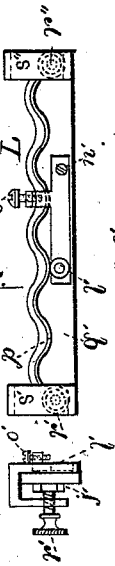
WITNESSES.
Herman Gauss.
Christopher Schutte.
INVENTOR.
Charles A. Holland,
Per
George D. Phillips

UNITED STATES PATENT OFFICE.

CHARLES A. HOLLAND, OF FAYETTEVILLE, NORTH CAROLINA, ASSIGNOR TO CHARLES A. AVERY, OF NEW YORK, N. Y.

HARNESS-MAKER'S STITCHING-HORSE.

SPECIFICATION forming part of Letters Patent No. 232,351, dated September 21, 1880.

Application filed July 12, 1880. (No model.)

*To all whom it may concern:*

Be it known that I, CHARLES A. HOLLAND, of Fayetteville, in the county of Cumberland and State of North Carolina, have invented certain new and useful Improvements in Harness-Makers' Stitching-Horses; and I do hereby declare that the following is a full, clear, and exact description of my invention, such as will enable others skilled in the art to which it appertains to make and use the same.

My invention is an improvement on the patent granted to me March 16, 1880, No. 225,604; and it consists of an automatic arrangement for closing the jaw, an improved device for feeding the work, device for supporting the work within the jaws, device for stitching wavy lines, &c., all of which will hereinafter appear.

To more clearly understand my invention, reference is had to the drawings accompanying this specification, and forming part thereof, of which—

Figure 1 represents a side elevation of the machine; Fig. 2, an end view; Fig. 3, a plan view; Fig. 4, a view, in perspective, of the work or support plates to operate between the jaws. Fig. 5 represents a section of the frame of the machine, showing an automatic arrangement for closing the jaws. Figs. 6, 7, 8, 9 are detail views of the feeding apparatus. Figs. 10 and 11 represent a sample of round work. Fig. 12 is a sample of scalloped work. Fig. 13 is a device for supporting the samples referred to. Figs. 14 and 15 represent an attachment for stitching wavy lines.

The machine is intended to be fastened on a bench and worked by foot, the sewing being done by hand through holes made by the needle or awl.

Its construction and mode of operation is as follows:

A is the frame of the machine, attached to which is the operating or foot lever B, which is connected, by the link $a$, to crank $b$ of the perpendicular shaft C. The other end of shaft C is attached to the feed-lever $c$, views of which are shown at Figs. 6 and 7. Attached to the feed-lever $c$ by the screw $d$ is the reversible feed-plate $e$. (See Fig. 8.)

Fig. 9 represents the adjustable feed-dog $f$, which rests on and is attached to the feed-plate $e$ by the screw $g$. The feed-dog $f$ has a slotted screw-hole $h$, to allow the proper adjustment. The plan view, Fig. 3, represents the feed-lever $c$, feed-plate $e$, and feed-dog $f$, combined in their proper relations to each other for operating and controlling the lever-bar D.

On the feed-lever $c$ is the roll and stud $i$, which engages with the elongated slot $j$ of lever-bar D. Said lever-bar is attached to the stud K of the movable slide E by the screw $l$. The other end, F, of lever-bar D, having clutch or opening $m$, engages with the roll and stud $n$, attached to the awl or needle-bar G, carrying awl $o$. The awl-bar has a reciprocating motion in the guide H. Said guide is attached to the slide E. The awl-bar G and slide E have motions at right angles with each other.

The mode of operation is as follows: Motion is communicated by the crank-shaft C to the feed-lever $c$, carrying feed plate and dog. The line of movement of the feed-lever $c$ is shown by the dotted arc 1 and 1'. The movement toward 1' carries the awl-bar G, holding awl toward the jaws $p$ and $q$, and pierces the work. The pressure of the awl in piercing the work slightly opens the jaw, just sufficient to admit of the work being fed by the awl, in combination with the forward movement of the slide E. Said movement is accomplished by the face $r$ of the feed-dog $f$ engaging with the end $s$ of lever-bar D. On the return movement of the feed-lever $c$ the points $r$ and $s$ engage, forming a toggle-joint, carrying forward the slide E, holding guide H and awl-bar G. The movement of the lever-bar and feed-lever in the direction of 1' operates to pierce the work, as hereinbefore stated; and to prevent the forward movement of the slide E when the lever and feed-bar are moving outward in the direction of 1', the feed-plate $e$, carrying feed-dog $f$, is arranged to swing on the screw $d$ and give way to the pressure of lever-bar D, permitting it to slip by. The notch 2 in the feed-plate $e$, engaging with the pin 3 in the feed-lever $c$, limits the throw of the feed-plate $e$. After the lever-bar D has passed by the feed-plate is returned to its original position by the pressure of the U-shaped spring $t$, attached to the end of the feed-lever $c$, said spring engaging with pin 4 of feed-plate $e$.

To reverse the feed or carry the work in an opposite direction, as indicated by the arrow 5, the feed-dog $f$ is detached and the feed-plate $e$ reversed, bringing the notch 6 in communication with the pin 3. The feed-dog $f$ is then secured to the feed-plate $e$, as before.

The feed-points $r$ and $s$ engage at the outward movement of feed-lever $c$ and lever-bar D, carrying the slide E forward to pierce the work before the levers $c$ and D reach their extreme outward throw. The roll $i$ engages with the extremity of the elongated slot $j$ of lever D and draws the slide back, the awl feeding the work in the direction of the arrow 5.

The object of reversing the feed and feeding in an opposite direction is that some stitchers prefer to work with the material feeding from instead of toward them. Instead of the feed-plate $e$ swinging by to relieve the strain and avoid feeding when the points $r$ and $s$ engage, as described, in the outward movement of the forward feed and the inward or return movement of the reverse feed, the plate $e$ or feed-dog $f$ could be arranged to lift and allow the point $s$ to pass under.

The finger $u$ on the end of feed-lever $c$, when near its inward or return stroke, engages with the pin 7 of the lever-bar D, operating to draw back the slide E, thereby requiring a much shorter movement of the foot-lever than would be the case if the roll $i$ traversed the full length of the slot $j$.

Fig. 4 is the perspective view of support-plate I and support-plate extension J, having standards $v$ $v'$, which rest on the plate I, the standards also having pins $w$ passing through the plate I, secured by the screw 10, enabling plate J to be raised to any position required. The standards $v$ $v'$ could be of the same size the entire length, and be supported by screw 10 instead of resting on plate I.

The pressure-plate K', attached to the rod X, and extending above the jaws, operates to hold the work down upon the support-plate. The proper tension is obtained by means of the spring $y$ on the rod X.

The end view, Fig. 2, represents the pressure and support plates attached to the machine, the rod $a'$ of the support-plate passing through the lugs 11 and 12. To the rod $a'$ is secured the stud $b'$ by means of the screw $c'$. This stud engages with one end of the lever $d'$. The other end of said lever engages with the cam $e'$, which operates to raise and lower the support-plate I, and producing a wavy stitch. The extension-plate J is used for stitching wavy lines and round work.

When a series of holes are punched in a wavy line and it is required to punch another series of holes in a wavy line parallel with the first series—as, for example, each edge of a trace—the top row or series will be punched with the material resting on the support-plate I. The extension-plate J is then attached to punch the lower edge or bottom series, raising the material up to the proper height with the awl. This is necessary, for after stitching one edge of the material it could be reversed; but it would be difficult to start the second series of holes directly opposite the first series, which, if not done, the top and bottom lines would not match and would be irregular. To obviate this the extension-plate J is attached, by means of which the work, as described, may be raised in line directly opposite the first holes.

Fig. 1 represents a view of the support-plate I, in position as usual, with the extension-plate J removed. The guide-points $f'$ $f''$, as shown at Figs. 2 and 4, are attached to the support-plate I, and are intended for stitching round work, a sample of which may be seen at Figs. 10 and 11, Fig. 10 being an end view. The leather $g'$ is bent in U-shape form, with the piece $h'$, of thicker material, in the center. A channel, $i'$ $i''$, is cut on each side, running the entire length of the strip. The channels $i'$ $i''$ engage with the guide-points $f'$ $f''$. Said points are raised up on line with the awl to enable the stitching to follow the channels. The angles are then trimmed off, leaving the piece true and round.

It is sometimes necessary for ornamental purposes in the manufacture of expensive or fancy harness to attach a piece of leather having scalloped or wavy edges to a plain piece, and in stitching it is necessary to follow the wavy or scalloped edge. Fig. 12 shows a view of the piece $j'$ partly stitched to the piece $k''$. To follow the wavy or scalloped edges, the roll attachment having the roll $l'$ and plate $m'$ (see Fig. 13) is fastened to the jaw $p$ by the screw $n'$ to the inner face of the jaw, and by the screw $o'$ to the top of said jaw. Any suitable method may be used to attach it to the jaw. The main object sought is to provide a smooth support for the scalloped edges to pass freely over with the least amount of friction. Any smooth surface would answer; but a roll would be preferable. The pressure-plate K' keeps the work down firmly on the roll with just sufficient tension to prevent slipping.

A former made of metal, preferably of sheet-steel, having scalloped edge, or, as shown at L, Fig. 14, with lateral scalloped projections $p'$ projecting from the face of the plain piece $q'$, may be used for all wavy lines, taking the place of the cam $e'$, the scalloped edge $p'$ to follow the roll $l'$, as in the case of the leather, as hereinbefore described.

The former L may be used as an auxiliary, to aid in stitching the scalloped piece $j'$ to the strip $k'$, by clamping it on with the thumb-screws $r'$ $r''$ of the projections $s'$ $s''$. (See end view, Fig. 15.)

Fig. 5 is a view of the automatic device for closing the movable jaw $q$, operated by the foot-lever B, to which is attached the connecting-rod M, the other end of said rod attached to crank N of upright shaft O, the other end of said shaft having cam-projection $t'$, which engages with the plate P. Said plate engages with the nut $u'$ and swivel-bolt $v'$. Said bolt is hinged to lug Q of movable jaw $q$. (See Fig. 2.)

Pushing the foot-lever B operates to relieve the contact of cam-projection $t'$ with plate P, and, as hereinbefore described, the awl in piercing the work slightly opens the jaw and relieves the pressure sufficient to feed, and the return movement of the foot-lever closes the jaw, holding the work firmly to enable the operator to draw the threads taut.

The cam $e'$, for stitching wavy lines, is operated by ratchet-wheel $w'$, having bar $w''$ and pawl $x'$, one end of said bar projecting into the opening $y'$ of slide E, and operated and controlled by the movement of said slide. (See Figs. 1 and 3.)

The pressure-plate K', when not in use, may be swung around in the position as shown at Fig. 3.

Having thus described my invention, what I claim as new, and desire to secure by Letters Patent, is—

1. In a harness-maker's stitching-horse, in combination with lever-bar D, the feed-lever $c$, having feed-plate $e$, and feed-dog $f$, so arranged as to feed by contact of lever-bar and feed-dog when moving in one direction, and arranged to release or slip by on contact with each other when moving in a contrary direction, as described and set forth.

2. The feed-dog $f$, having screw $g$, in combination with the feed-plate $e$, as herein set forth.

3. The reversible feed-plate $e$, having notches 2 and 6 and pin 4, in combination with feed-bar $c$ and spring $t$, as set forth.

4. The combination of feed-lever $c$, having finger $u$, with pin 7 of lever-bar D, so arranged as to engage and draw back the slide E and shorten the throw of the foot-lever, as specified.

5. The support-plate I, having rod $a'$, extension-plate J, and holding pressure-plate K', in combination with jaws $p$ and $q$, as described.

6. The combination of pressure-plate K', having rod $x$, and spring $y$ with support-plate I, as set forth.

7. The combination of support-plate I, rod $a'$, stud $b'$, extension-plate J, pressure-plate K', having rod $x$, spring $y$, with lever $d'$, and cam $e'$, as described.

8. The combination, with awl-bar G and awl $o$, of the guide-points $f'$ $f''$ for guiding round-work, as specified.

9. The combination, with jaws $p$ and $q$, of the roll $l'$, having supporting-screws $n'$ $o'$, for proper attachment to the jaw, as described.

10. The combination, with jaws $p$ and $q$ and awl $o$, of the wave-former L, having wavy or scalloped edges or projection $p'$, arranged with roll $l'$ to produce wavy perforations in the material, as described.

11. The hinged or swivel bolt $v'$, having nut $u'$, in combination with jaw $q$, having lug Q, substantially as described.

12. The automatic arrangement for closing the movable jaw $q$, consisting of the shaft O, having projection $t'$, connection M, and crank N, in combination with foot-lever B, plate P, and swivel bolt $v'$, having nut $u'$, substantially as described, and for the purpose set forth.

In testimony that I claim the foregoing I have hereunto subscribed my name in the presence of two witnesses.

CHARLES A. HOLLAND.

Witnesses:
  HERMAN GAUSS,
  CHRISTOPHER SCHULTE.